US011290859B2

(12) United States Patent
Parvataneni et al.

(10) Patent No.: US 11,290,859 B2
(45) Date of Patent: Mar. 29, 2022

(54) METHOD AND SYSTEM FOR CONTENT DISTRIBUTION AMONG MEC NETWORKS

(71) Applicant: Verizon Patent and Licensing Inc., Arlington, VA (US)

(72) Inventors: Raghuram Parvataneni, Edison, NJ (US); Mohammad Raheel Khalid, Budd Lake, NJ (US); Ravi Sharma, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 133 days.

(21) Appl. No.: 16/683,849

(22) Filed: Nov. 14, 2019

(65) Prior Publication Data
US 2021/0152998 A1  May 20, 2021

(51) Int. Cl.
*H04W 4/50* (2018.01)
*H04L 47/2475* (2022.01)
*H04W 28/02* (2009.01)

(52) U.S. Cl.
CPC ........... *H04W 4/50* (2018.02); *H04L 47/2475* (2013.01); *H04W 28/0236* (2013.01)

(58) Field of Classification Search
CPC ............... H04W 4/50; H04W 28/0236; H04L 47/2475; H04L 45/64; H04L 12/4633; H04L 43/08; H04L 67/10; H04L 67/1095; H04L 65/4084; H04L 67/02; H04L 67/2842; H04L 67/327; H04L 41/5022; H04L 45/302; H04L 45/306; H04L 45/70
See application file for complete search history.

(56) References Cited

U.S. PATENT DOCUMENTS

| 2012/0278802 | A1* | 11/2012 | Nilakantan | H04L 41/0886 718/1 |
| 2014/0086253 | A1* | 3/2014 | Yong | H04L 45/50 370/395.53 |
| 2016/0218947 | A1* | 7/2016 | Hughes | H04L 12/2854 |
| 2018/0322785 | A1* | 11/2018 | Jerichow | G08G 1/0141 |

FOREIGN PATENT DOCUMENTS

WO  WO-2020018704 A1 * 1/2020 ........... H04L 47/125

OTHER PUBLICATIONS

Nygren et al., "The Akamai Network: A Platform for High-Performance Internet Applications", Aug. 2010, ACM SIGOPS Operating Systems Review. (Year: 2010).*

Dilip et al., "OCALA: An Architecture for Supporting Legacy Applications over Overlays", 2006, USENIX NSDI—teaches selecting the best overlay (see p. 2, five para, from bottom). (Year: 2006).*

* cited by examiner

*Primary Examiner* — Michael K Phillips

(57) ABSTRACT

A method, a device, and a non-transitory storage medium are described in which a edge content distribution service is provided. The edge content distribution service may include the distribution of static content among multi-access edge computing networks. The edge content distribution service may include tiered overlay networks that are correlated to performance metrics associated with application services, static contents of the application services, and/or the acquisition and delivery of the static contents. The edge content distribution service also consider available network resources at the multi-access edge computer networks and the overlay networks of the tiered architecture.

20 Claims, 13 Drawing Sheets

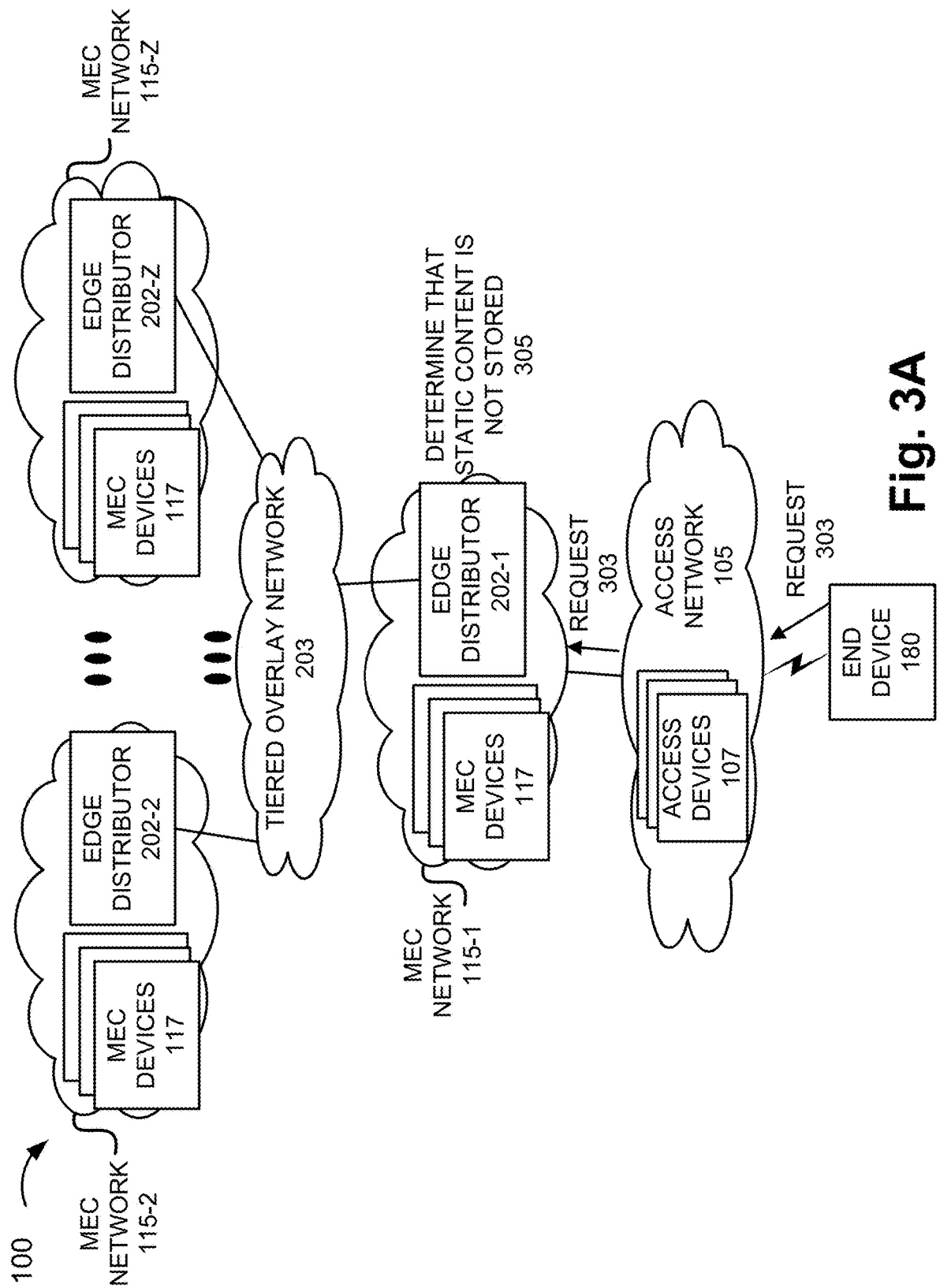

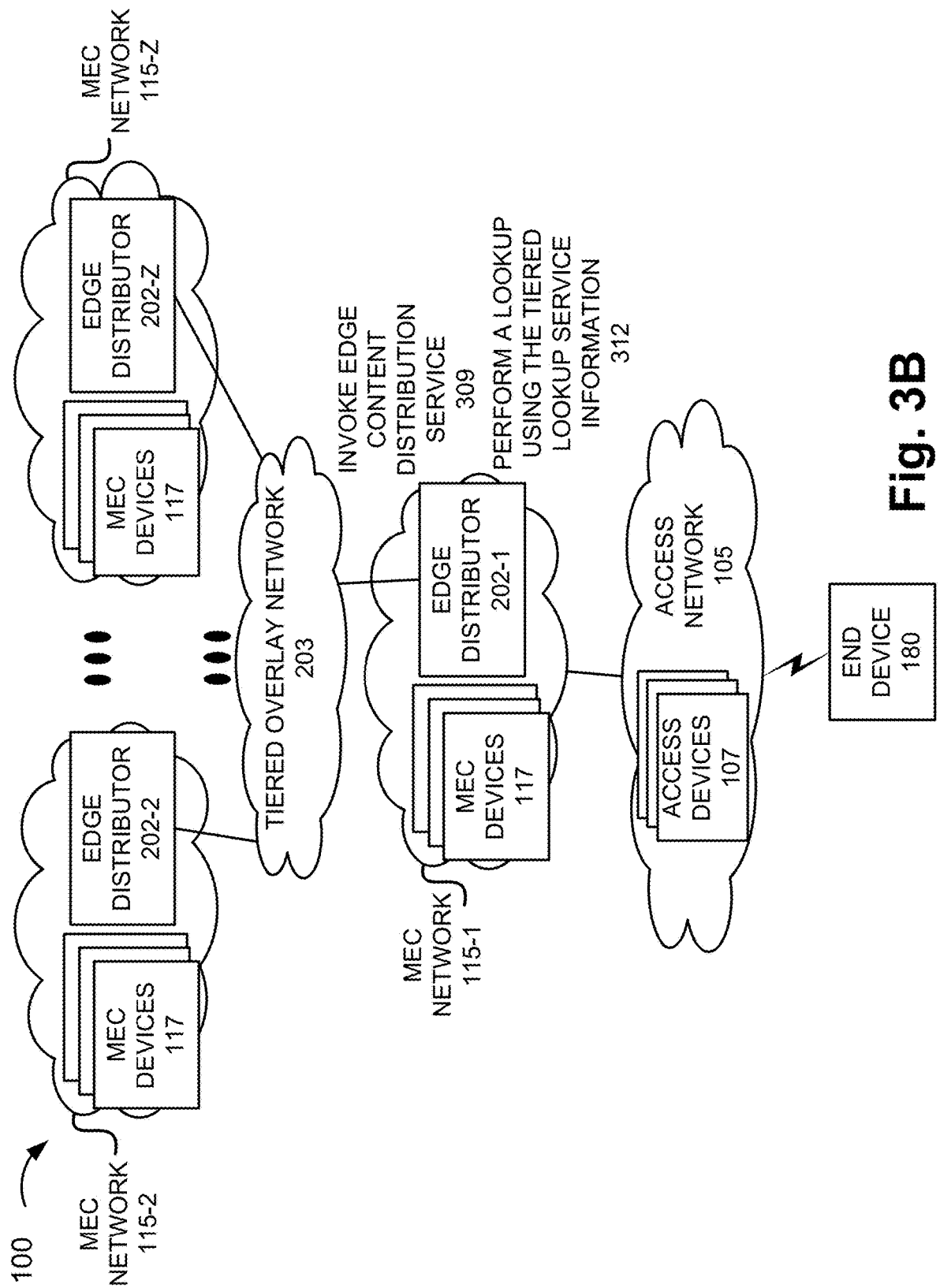

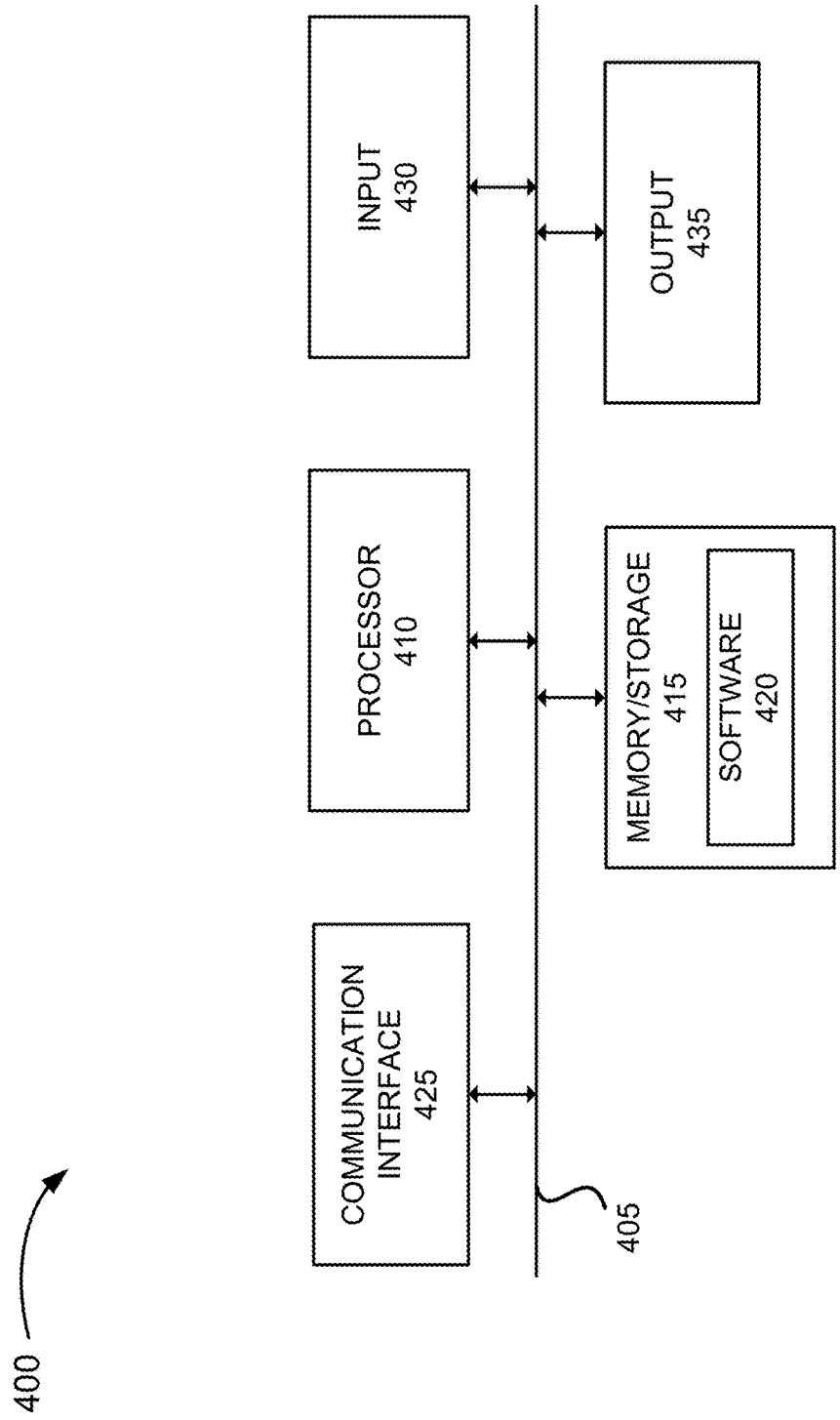

METHOD AND SYSTEM FOR CONTENT DISTRIBUTION AMONG MEC NETWORKS

BACKGROUND

Development and design of networks present certain challenges from a network-side perspective and an end device perspective. In order to enhance performance, multi-access edge computing (MEC) (also known as mobile edge computing (MEC)) is being explored in which core network capabilities (e.g., computational, storage, communication links, etc.) are situated at the network edge in order to reduce traffic being sent to the core network and reduce latency amongst other things.

BRIEF DESCRIPTION OF THE DRAWINGS

FIGS. 3A-3F are diagrams illustrating an exemplary process of an exemplary embodiment of the edge content distribution service;

FIG. 4 is a diagram illustrating exemplary components of a device that may correspond to one or more of the devices illustrated and described herein.

DETAILED DESCRIPTION OF PREFERRED EMBODIMENTS

Figure 1:
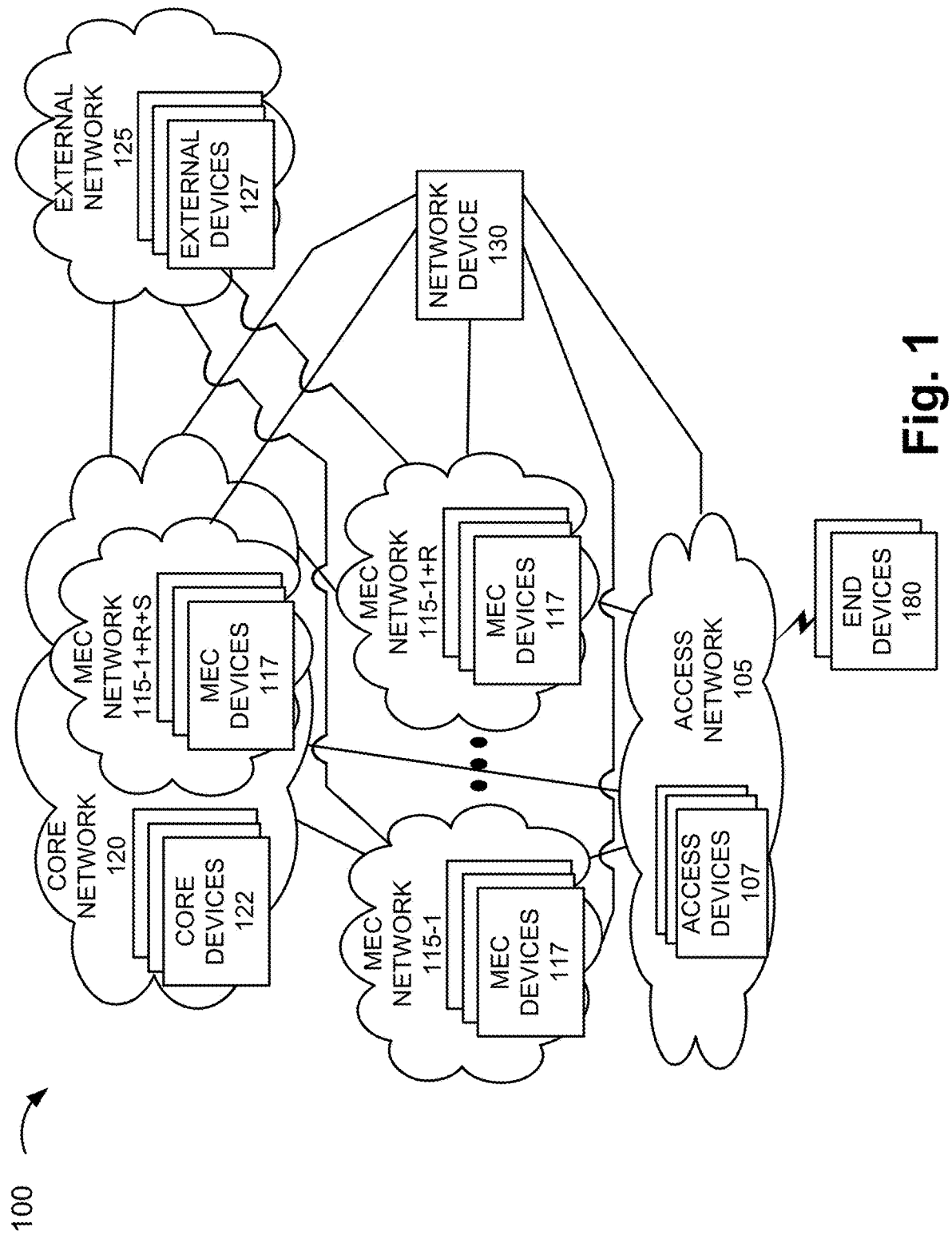
FIG. 1 is a diagram illustrating an exemplary environment in which an exemplary embodiment of an edge content distribution service may be implemented.

The following detailed description refers to the accompanying drawings. The same reference numbers in different drawings may identify the same or similar elements. Also, the following detailed description does not limit the invention.

MEC networks or other types of end device application or service layer networks (referred to as "application service layer network") provide an application and/or a service (referred to as an "application service"). The application service may include a monolithic application, a microservice, or another type of configurable architecture of an application service. Typically, the MEC network stores all of the static content of an application service to enable servicing end devices. However, such a configuration of the MEC network may increase content distribution, increase allocation and use of backhaul network resources, and may increase the time for application service provisioning.

According to exemplary embodiments, an edge content distribution service is described. According to an exemplary embodiment, the edge content distribution service is provided by MEC networks. According to an exemplary embodiment, each MEC network may contribute to a shared distribution of contents among other MEC networks. According to an exemplary embodiment, the MEC networks may store lookup service data indicating locations for each part of a content, as described herein. For example, the lookup service data may be implemented as a distributed hash table or another type of suitable data structure or database.

According to an exemplary embodiment, the edge content distribution service may include tiered overlay networks. The tiered overlay networks may distribute and make available contents among MEC networks based on a performance metric associated with the content. There may be multiple tiers that correlate to different types of contents and/or a performance metrics (e.g., latency, throughput, bandwidth, etc.). According to an exemplary embodiment, the lookup service data includes correlations between contents and performances metrics. Additionally, according to an exemplary embodiment, the edge content distribution service may consider other factors relating to the distribution of content (e.g., acquisition of a piece of content and/or the content as a whole), such as resource constraints of a MEC network that may store a piece of content, network resource constraints (e.g., associated with communication links, intermediary network devices, etc., of a tiered overlay network) between a requesting MEC network and a serving MEC network, and/or other types of costs pertaining to the distribution of the content (e.g., computational costs, power costs, etc.). In this way, the edge content distribution service may not only locate where all parts of static content are located via the lookup service data, but may also optimize how the content may be distributed, the content flow, and other cost factors. The lookup service data, such as the distributed hash table or other type of data structure or database, may be continuously updated.

According to an exemplary embodiment, the edge content distribution service includes a repository device that may store contents. For example, new content may be initially on-boarded and stored by the repository device for use by the edge content distribution service. Additionally, or alternatively, the repository device may store previously distributed contents (e.g., in whole or in part). MEC networks may have access to the repository device.

According to an exemplary embodiment, the content subject to the edge content distribution service is "static content." For example, the static content may be a part of an application service, such as a virtual machine (VM) file, a document image, a server component of an application service, or other types of "fixed" data (e.g., audio and video data, etc.) or stateless data. By way of further example, a computer vision application may include static content such as data models or business logic. Additionally, the static content may include an update to the static content. For example, a portion of the VM file may be updated. According to an exemplary embodiment, the edge content distribution service may distribute only the update to the static content in pieces or chunked data without full transmission of the entire static content.

Although the edge content distribution service may be described in relation to MEC networks, according to other exemplary embodiments, other types of application service layer networks may be implemented to include the edge content distribution service.

In view of the foregoing, the edge content distribution service may reduce or minimize content distribution among MEC networks, reduce or minimize backhaul resources used for such content distribution, and reduce or minimize the time to provision an application service. Also, the edge content distribution service may provide content distribution without orchestration based on edge and/or load capacity because each MEC network may update the distributed hash table or other suitable data structure.

FIG. 1 is a diagram illustrating an exemplary environment 100 in which an exemplary embodiment of the edge content distribution service may be implemented. As illustrated, environment 100 includes access network 105, MEC network 115-1 through 115-1+R+S (referred collectively as MEC networks 115; and individually or generally as MEC network 115), a core network 120, and an external network 125. Access network 105 includes access devices 107. MEC network 115 includes MEC devices 117. Core network 120 includes core devices 122. External network 125 includes external devices 127. Environment 100 further includes network device 130 and end devices 180.

The number, type, and arrangement of networks illustrated in environment 100 are exemplary. For example, according to other exemplary embodiments, environment 100 may include an additional and/or different application service layer network that may or may not be subject to the edge content distribution service. Additionally, or alternatively, other networks not illustrated in FIG. 1 may be included, such as a backhaul/fronthaul network or another type of intermediary network, as described herein.

The number, the type, and the arrangement of network devices, and the number of end devices 180 are exemplary. A network device, a network element, or a network function (referred to herein simply as a network device) may be implemented according to one or multiple network architectures, such as a client device, a server device, a peer device, a proxy device, a cloud device, a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.).

Environment 100 includes communication links between the networks, between the network devices, and between end devices 180 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the edge content distribution service may use at least one of these planes of communication. Additionally, an interface of a network device may be modified (e.g., relative to an interface defined by a standards body, such as Third Generation Partnership Project (3GPP), International Telecommunication Union (ITU), European Telecommunications Standards Institute (ETSI), etc.) or a new interface of the network device may be provided in order to support the communication (e.g., transmission and reception of messages, information elements (IE), attribute value pairs (AVPs), etc.) between network devices and the edge content distribution service, as described herein. According to various exemplary implementations, the interface of a network device may be a service-based interface or a reference point-based interface.

Access network 105 may include one or multiple networks of one or multiple types and technologies. For example, access network 105 may be implemented to include a Fourth Generation (4G) radio access network (RAN) (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, a next generation RAN (e.g., a Fifth Generation (5G)-access network (5G-AN) or a 5G-RAN (referred to herein as simply a 5G-RAN)), another type of future generation RAN, and/or another type of RAN (e.g., a legacy Third Generation (3G) RAN, etc.). Access network 105 may communicate with other types of access networks, such as, for example, a WiFi network, a Worldwide Interoperability for Microwave Access (WiMAX) network, a local area network (LAN), a Citizens Broadband Radio System (CBRS) network, a cloud RAN, a wired network (e.g., optical, cable, etc.), an optical network, or another type of network that provides access to or can be used as an on-ramp to access network 105, MEC network 115, and/or core network 120.

Access network 105 may include different and multiple functional splitting, such as options 1, 2, 3, 4, 5, 6, 7, or 8 that relate to combinations of access network 105 and core network 150 including an Evolved Packet Core (EPC) network and/or a NG core (NGC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

According to some exemplary embodiments, access network 105 may be implemented to include various architectures of wireless service, such as, for example, macrocell, microcell, femtocell, picocell, metrocell, new radio (NR) cell, LTE cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 Gigahertz (GHz), above 6 GHz, licensed radio spectrum, unlicensed radio spectrum, etc.), and/or other attributes or technologies used for radio communication.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a CU, a DU, a small cell node (e.g., a picocell device, a femtocell device, a microcell device, a home eNB, etc.), a future generation wireless access device, another type of wireless node (e.g., a WiFi device, a WiMax device, a hotspot device, etc.) that provides a wireless access service, or other another type of network device that provides a transport service (e.g., routing and forwarding), such as a router, a switch, or another type of layer 3 (e.g., network layer of the Open Systems Interconnection (OSI) model) network device. Additionally, or alternatively, access devices 110 may include wired and/or optical devices (e.g., modem, wired access point, optical access point, Ethernet device, etc.) that provide network access.

MEC network 115 includes a platform that provides an application service. As illustrated, MEC network 115 may be located at an edge of a network, such as access network 105, or co-located with another type of network, such as core network 120 or external network 125. Alternatively, MEC network 115 may not be co-located. MEC network 115 may be implemented using one or multiple technologies including, for example, network function virtualization (NFV), containers, SDN, cloud computing, Infrastructure-as-a-Service (IaaS), Platform-as-a-Service (PaaS), Software-as-a-Service (SaaS), or another type of network technology.

Depending on the implementation, MEC network 115 may include various types of network devices that are illustrated in FIG. 1 as MEC devices 117. For example, MEC devices 117 may include virtual network devices (e.g., virtualized network functions (VNFs), servers, hosts, containers, hypervisors, virtual machines, network function virtualization infrastructure (NFVI), and/or other types of virtualization elements, layers, hardware resources, operating systems, engines, etc.) and associated applications services for use by end devices 180. The application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, and/or other types of mobile edge application services.

Additionally, depending on the implementation, MEC devices 117 may include other types of network devices, such as an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, and/or other types of network devices (e.g., routers, core devices 122, an ingress device, a load balancer, etc.), and network resources (e.g., storage devices, communication links, etc.).

According to an exemplary embodiment, each MEC network 115 includes a network device that provides the edge content distribution service. According to an exemplary embodiment, the network device stores or has access to lookup service data that allows the network device to locate and retrieve a content piece that may be stored by one or more other MEC networks 115. For example, the lookup service data may indicate the locations (e.g., network addresses, uniform resource indicators (URIs), MEC network identifiers, etc.) and content pieces (e.g., content piece identifier, content piece name, etc.) of contents that may be stored and shared among multiple MEC networks 115. The lookup service data may also include performance metric data that may correlate or pertain to a content (and/or a piece of content) and/or a tiered overlay network. For example, the performance metric data may indicate a performance metric parameter and value relating to latency, throughput, bandwidth, reliability, packet drop rate, error rate, or another quality of service (QoS) parameter and value that relates to the acquisition and/or delivery of the content, as described herein. The lookup service data may further include tiered overlay network data. The tiered overlay network data may include an identifier of an overlay network that supports the performance metric and/or other factor, as described herein. As previously described, according an exemplary embodiment, the edge content distribution service includes multiple overlay networks. Different overlay networks of the tiered system may support different types of content, performance metrics, and/or other factors considered, as described herein.

According to an exemplary embodiment, the network device may continuously update the lookup service data as the edge content distribution service is used and parts of content are obtained among MEC networks 115. According to some exemplary embodiments, the network device may obtain the parts of the content from other MEC networks 115 and/or a repository device based on the lookup service data. According to some exemplary embodiments, the network device may also assemble the parts of the content. According to other exemplary embodiments, another network device of MEC network 115 may obtain the parts of the content and/or assemble the parts of the content. The network device is described further below.

Core network 120 may include one or multiple networks of one or multiple network types and technologies. Core network 120 may include a complementary network of access network 105. For example, core network 120 may be implemented to include an Evolved Packet Core (EPC) of an LTE, an LTE-A, an LTE-A Pro, a next generation core (NGC) network, and/or a future generation core network. Core network 150 may include a legacy core network.

Depending on the implementation of core network 120, core network 120 may include various types of network devices that are illustrated in FIG. 1 as core devices 122. For example, core devices 122 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a network exposure function (NEF), a policy control function (PCF), a network data analytics function (NWDAF), and/or an application function (AF). According to other exemplary implementations, core network 120 may include additional, different, and/or fewer network devices than those described. For example, core devices 122 may include a non-standard and/or a proprietary network device, or another type of network device that may be well-known but not particularly mentioned herein.

External network 125 may include one or multiple networks of one or multiple network types and technologies. For example, external network 125 may be implemented to include an application service layer network, such as the Internet, the Web, an Internet Protocol Multimedia Subsystem (IMS) network, a Rich Communication Network (RCS) network, a cloud network, a packet-switched network, a data center, a private network, or other type of network that hosts an end device application service. According to some exemplary embodiments, although not illustrated, external network 125 may include MEC network 115 and MEC devices 117. According to such an embodiment, network device 130 may communicate with this MEC network 115 and may be subject to the edge content distribution service, as described herein.

Depending on the implementation of external network 125, external network 125 may include various network devices depicted in FIG. 1 as network devices 127. For example, network devices 127 may provide various applications, services, or another type of end device asset, such as a server (e.g., web, application, cloud, etc.), mass storage device, data center devices, routers, and/or other types of network devices pertaining to various network-related functions.

Network device 130 may include logic that provides the edge content distribution service. For example, network device 130 may store contents (e.g., the repository device). The contents may be new and/or previously distributed among MEC networks 115. Network device 130 may include a portal service or communicates with an external portal service (e.g., associated with another network device not illustrated) that allows a user to on-board new content to network device 130. The portal service may also allow the user to delete content, update content, and perform other types of data management tasks. According to some exemplary embodiments, network device 130 may seed certain MEC networks 115 of an overlay network with new content, as described herein. For example, depending on the static content (e.g., size, etc.) and/or other factors (e.g., start-up time of an application service or other considerations described herein), network device 130 may elect to seed or not seed pieces of the content to MEC networks 115 of an overlay network associated with a tiered overlay network, as described herein.

End device 180 includes a device that has computational and communication capabilities (e.g., wireless, wired, optical, etc.). End device 180 may be implemented as a mobile device, a portable device, a stationary device (e.g., a non-mobile device), a device operated by a user, or a device not operated by a user. For example, end device 180 may be implemented as a Mobile Broadband device, a smartphone, a computer, a tablet, a netbook, a phablet, a wearable device (e.g., a watch, glasses, a visor, etc.), a vehicle support system, an Internet of Things (IoT) device, a user device, an autonomous device, a smart device, a drone, customer premise equipment (e.g., a set top box, etc.), a streaming player device, a global positioning device, a game system, a music playing system, or some other type of wireless, wired, and/or optical end device. According to various exemplary embodiments, end device 180 may be configured to execute various types of software (e.g., applications, programs, etc.). The number and the types of software may vary among end devices 180.

End device 180 may support one or multiple RATs (e.g., 4G, 5G, etc.) and various portions of the radio spectrum (e.g., multiple frequency bands, multiple carrier frequencies, licensed, unlicensed, etc.), network slicing, DC service, and/or other types of connectivity services. Additionally, end device 180 may include one or multiple communication interfaces that provide one or multiple (e.g., simultaneous) connections via the same or different RATs, frequency bands, carriers, network slices, and/or other communication medium (e.g., wired, etc.). The multimode capabilities of end device 180 may vary among end devices 180.

Figure 2A:
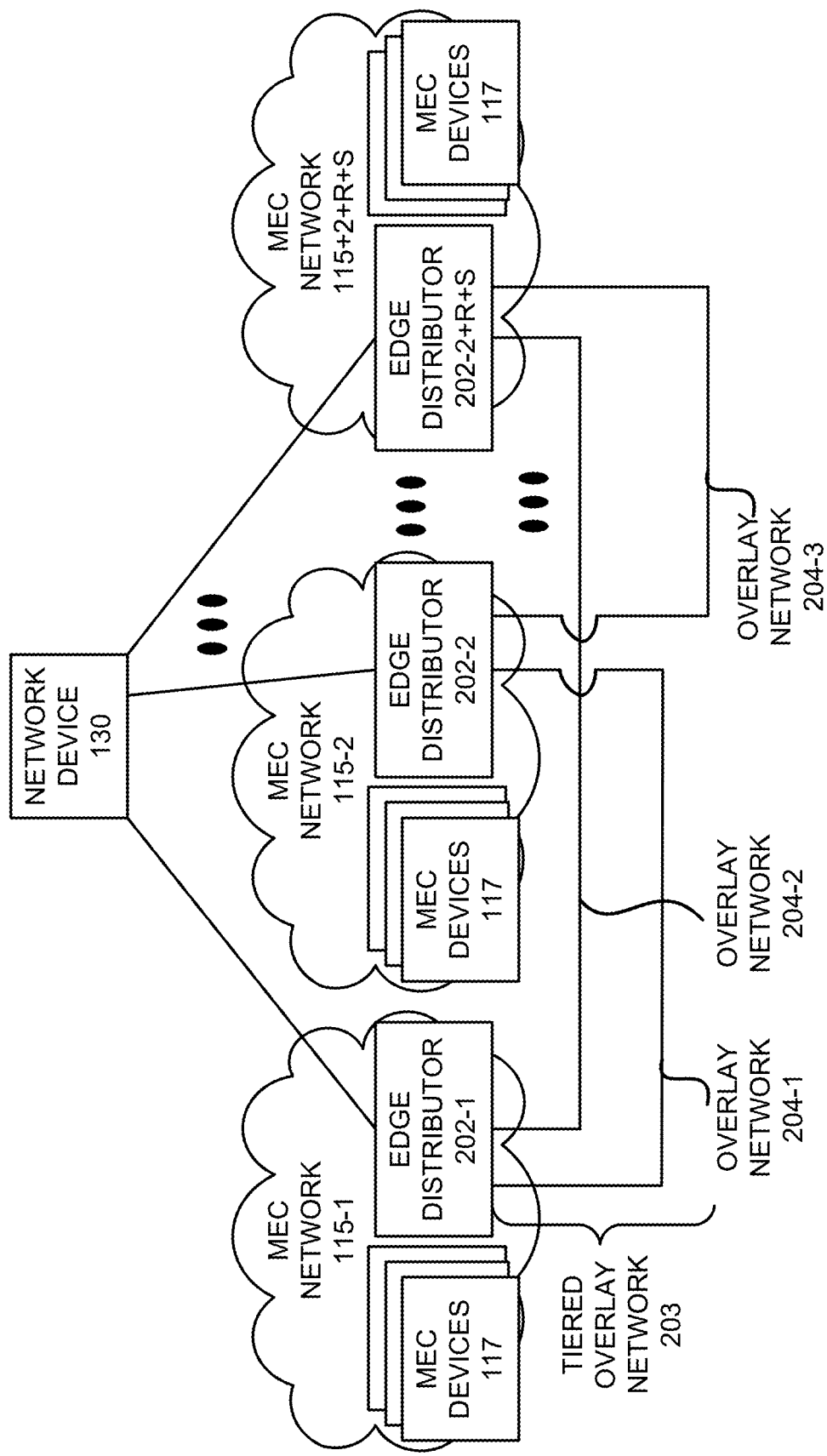
FIG. 2A is a diagram illustrating exemplary components of an exemplary embodiment of the network device depicted in FIG. 1 that provides the edge content distribution service.

FIG. 2A is a diagram illustrating a portion of an exemplary environment 200 in which an exemplary embodiment of the edge content distribution service may be implemented. As illustrated, MEC networks 115 may include edge distributor devices 202-1 through 202-2+R+S (referred collectively as edge distributors 202; and individually or generally as edge distributor 202). According to an exemplary embodiment, each edge distributor device 202 is communicatively coupled to network device 130. Additionally, edge distributor devices 202 may be communicatively coupled via a tiered overlay network 203. As illustrated, tiered overlay network 203 may comprise overlay networks 204-1 through 204-3 (also referred to as overlay networks 204, and individually or generally as overlay network 204).

Figure 2B:
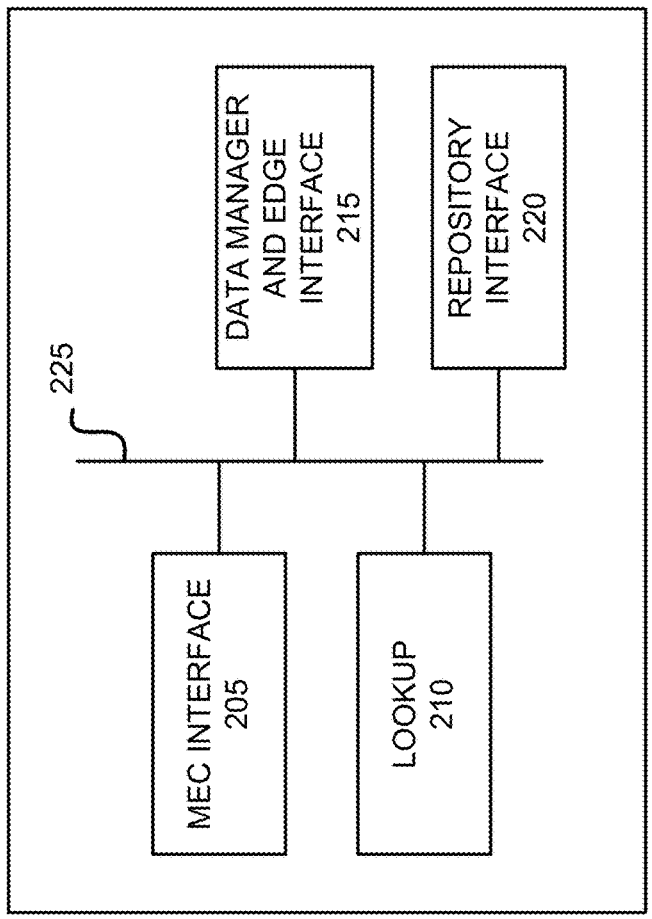
FIG. 2B is a diagram of exemplary application service information that may used to provide the edge content distribution service.

FIG. 2B is a diagram illustrating exemplary components of an exemplary embodiment of edge distributor device 202. As illustrated, edge distributor device 202 may include a MEC interface 205, a lookup 210, a data manager and edge interface 215, a repository interface 220, and a link 225. According to other exemplary embodiments, edge distributor device 202 may include additional, fewer, and/or different components.

MEC interface 205 may include logic that receives requests for content from MEC device 117 of MEC network 115. MEC interface 205 may further include logic that transmits responses for content to MEC device 117. For example, the response may include the content or a piece of the content. MEC interface 205 may communicate with an edge controller (e.g., a VIM, a VNFM, an ME platform manager, an orchestrator, or another type of control layer network device). According to some exemplary implementations, one or more functional components of edge distributor 202, as described herein, such as MEC interface 205, may be included in the edge controller.

Lookup 210 may include logic that stores lookup service data that supports a lookup service included in the edge content distribution service. According to an exemplary embodiment, the lookup service data may be stored in a distributed hash table. Lookup 210 may identify another edge distributor device 202 from which a piece of content may be retrieved based on the lookup service data. Lookup 210 may provide identified lookup data to data manager and edge interface 215. Lookup 210 may include logic that updates the lookup service data relating to other peer MEC networks 115, network device 130, and content, such as static content.

Figure 2C:
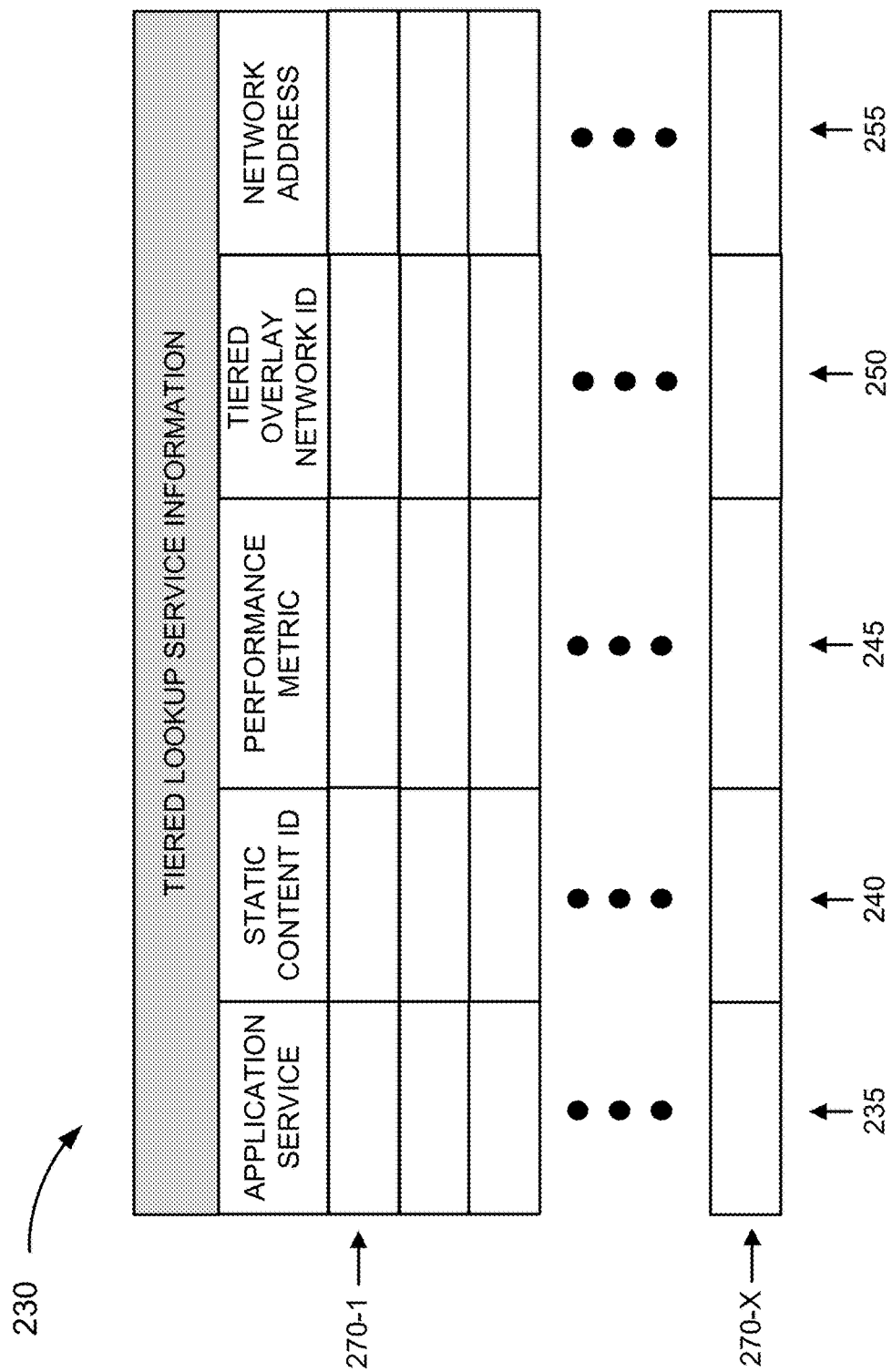
FIG. 2C is a diagram illustrating exemplary tiered lookup service information.

FIG. 2C is a diagram illustrating exemplary tiered lookup service information that may be stored in a table 230. As illustrated, table 230 may include an application service field 235, a static content identifier field 240, a performance metric field 245, a tiered overlay network identifier field 250, and a network address field 255. As further illustrated, table 230 includes records 270-1 through 270-X (also referred to as records 270, or individually or generally as record 270) that each includes a grouping of fields 235 through 255. Tiered lookup service information is illustrated in tabular form merely for the sake of description. In this regard, tiered lookup service information may be implemented in a data structure different from a table.

Application service field 235 may store data indicating an application service. For example, application service field 235 may store an identifier that identifies an application service (e.g., X application service, Y application service, Z microservice, etc.) or a category of an application service (e.g., IoT application service, a real-time (RT) application service, an ultra reliable low latency communication (URLLC) application service, an enhanced mobile broadband (EMBB) application service, a mission critical (MC) application service, a massive machine-type communication (mMTC) application service, an over-the-top (OTT) application service, or some other category or type of application service).

Static content identifier field 240 may store data that identifies a piece of static content. As an example, static content identifier field 240 may store multiple identifiers corresponding to multiple pieces of the static content. Static content identifier field 240 may also store data that identifies the static content as a whole. For example, static content identifier field 240 may store a unique identifier that identifies a VM file or another type of static content.

Performance metric field 245 may store data indicating one or multiple threshold performance metric values pertaining to the static content identified in static content identifier field 240. For example, performance metric field 245 may store one or multiple threshold parameters and values pertaining to latency, error rate, throughput, packet loss, guaranteed flow bit rate (GFBR), guaranteed bit rate (GBR), non-GBR, response time, and/or another type of threshold performance metric parameter and value pertaining to the acquisition and/or delivery of the static piece of content.

Performance metric field 245 may also store parameters and values related to minimum available network resources at MEC network 115 from which the static piece of content is obtained. For example, the data may indicate minimum or threshold available processing requirements related to various network resources (e.g., processor, storage, memory, virtual, logical, etc.) that may be used to acquire and deliver the static piece of content. Performance metric field 245 may further store parameters and values related to minimum available network resources (e.g., communication link capacity, intermediary network device capacity, etc.) of overlay network 204 from which the static piece of content is obtained. Edge distributor 202 may omit to generate and transmit a request for a piece of content when the available network resources at a MEC network 115 and/or portion of an overlay network 204 (e.g., that communicatively couples a (requesting) MEC network 115 and a candidate (serving) MEC network 115) are not satisfied. As described herein, edge distributor 202 may obtain the available network resources from other MEC networks 115 and overlay networks 204.

According to some exemplary embodiments, MEC networks 115 may be configured to support the distribution of specific types of static content and correspondingly be a part of certain overlay networks 240. Additionally, for example, overlay networks 204 may be configured to support the distribution of specific types of static content and/or application services based on various administrative configurable criteria (e.g., size of the static content, response times for provisioning the application service, QoS metric associated with the application service, etc.).

Tiered overlay network identifier field 250 may store data that identifies an overlay network 204 of the tiered overlay network 203 architecture, as described herein. For example, the identifier may be a unique value (e.g., numeric, alphanumeric, alphabetic, etc.). According to some exemplary implementations, tiered overlay network identifier field 250 may store multiple identifiers that identify different overlay networks 204. Additionally, tiered overlay network identifier field 250 may store preference data that indicates an order of preference when there are multiple candidate overlay networks 204 available. For example, when there are network resource constraints pertaining to an overlay network 204, the edge content distribution service may select another overlay network 204 based on the preference data.

Network address field 255 may store data indicating a network address of a network device that stores a piece of content or has access to the piece of content for retrieval. For example, network address field 255 may store an IP address, a URI, a network address and a port or socket, or some other type of physical, logical, or virtual address pertaining to the piece of content.

According to other exemplary implementations, table 230 may store additional, fewer, and/or different instances of tiered lookup service information in support of the edge content distribution service, as described herein. According to some exemplary embodiments, edge distributor device 202 may store tiered lookup service information pertaining to the acquiring of a static piece of content (e.g., client side) from another MEC network 115 (e.g., serving side), and tiered lookup service information pertaining to the lookup and delivery of a static piece of content (e.g., server side) to another MEC network (e.g., client side).

Referring back to FIG. 2B, data manager and edge interface 215 may include logic that transmits queries for static content pieces to other MEC networks 115. Data manager and edge interface 215 may include logic that receives and interprets responses to queries from the other MEC networks 115. Data manager and edge interface 215 may use the lookup service, as described herein to obtain a static content and the associated static content pieces. According to some exemplary embodiments, data manager and edge interface 215 may assemble static content pieces that are obtained. Data manager and edge interface 215 may provide an assembled static content or pieces of static content to MEC interface 205. In turn, MEC interface 205 may communicate the static content for provisioning the application service to a suitable MEC device 117 (e.g., an edge controller, a virtual server to provide the application service, etc.).

Data manager and edge interface 215 may also include logic that services query requests from other MEC networks 115 for static content pieces, which may be stored in MEC network 115 of data manager and edge interface 215. Data manager and edge interface 215 may use the lookup service to retrieve and deliver a static content piece to another MEC network 115 via the appropriate overlay network 204.

Repository interface 220 may include logic that communicates with network device 130. For example, repository interface 220 may obtain new static content (in whole or in part) from repository interface 220. Additionally, for example, repository interface 220 may obtain a static piece of content from network device 130, which may have been already distributed among some of MEC networks 115.

Link 225 may provide a communicative link between two or more components in which data may be communicated. For example, link 225 may be implemented as a hardware link (e.g., a bus, a shared memory space, etc.), a software link (e.g., inter-process communication (IPC), etc.) or some other type of communicative link (e.g., an application programming interface (API), etc.).

Referring back to FIG. 2A, tiered overlay network 203 may include multiple overlay networks 204. The number of overlay networks 204 illustrated and described herein are merely exemplary. According to an exemplary embodiment, the edge content distribution service may use different overlay networks 204 to transmit and receive static pieces of content among MEC networks 115 depending on the static content and associated tiered lookup service information, as described herein. Additionally, according to an exemplary embodiment, the edge content distribution service may use other factors in selecting a MEC network to obtain a static piece of content, such as available network resources in the MEC network 115. For example, if a (serving) MEC network 115 is unable to support a download of a static piece of content due to resource constraints, the (client) MEC network 115 may select another MEC network 115 from which to obtain the desired static piece of content. Additionally, according to some exemplary scenarios, the selection of another MEC network 115 may involve using a different tiered overlay network 204. The edge content distribution service may consider even other factors, such as optimizing costs associated with overlay network 204 (e.g., use of network resources) and costs (e.g., use of network resources) associated with a (serving) MEC network 115 to obtain a static piece of content.

FIGS. 3A-3F are diagrams illustrating an exemplary process of the edge content distribution service. According to an exemplary scenario, assume that the static content has been distributed among MEC networks 115.

Figure 3C:
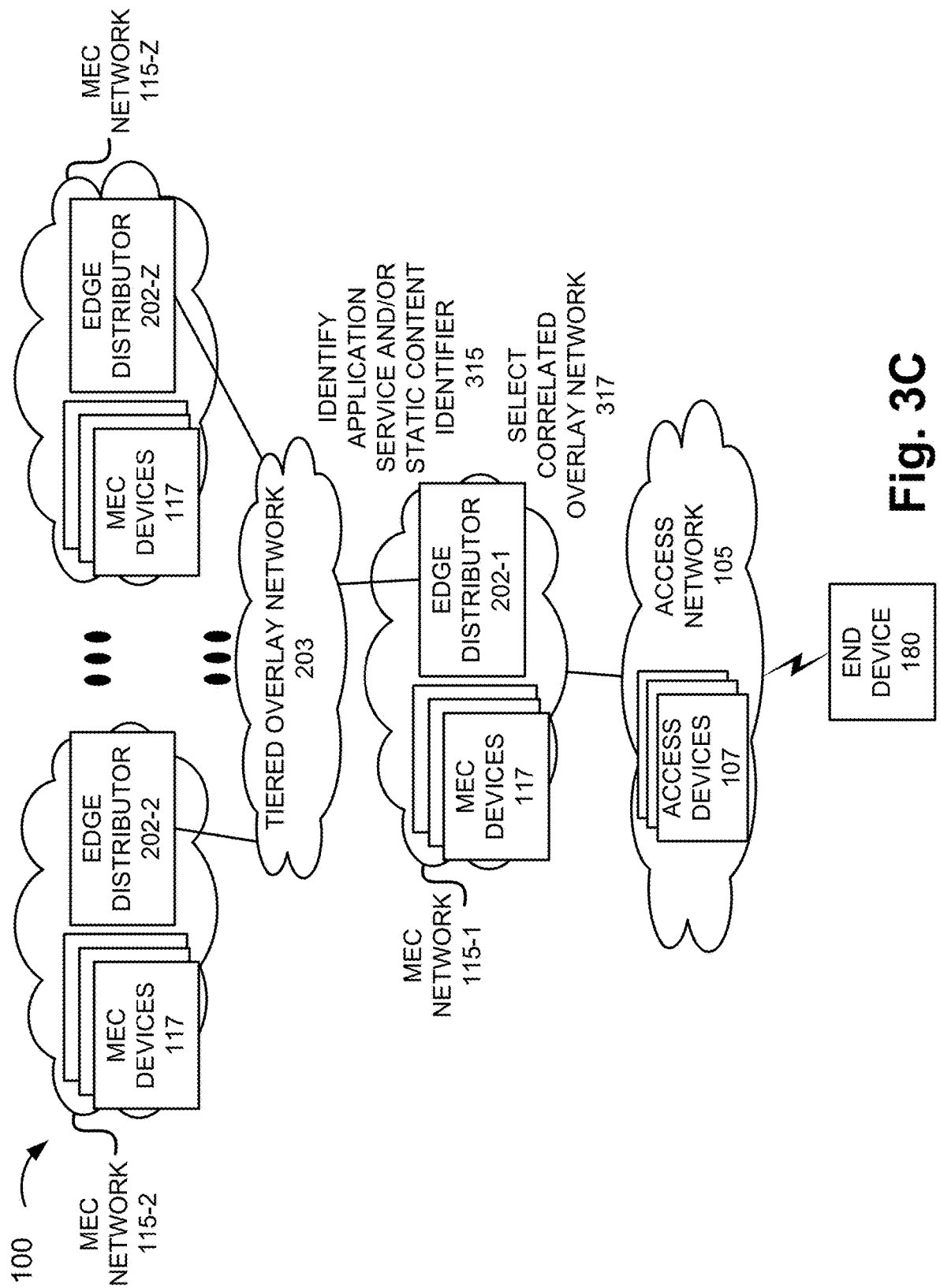

Referring to FIG. 3A, assume that end device 180 transmits a request 303 for an application service via access network 105, and request 303 is received by edge distributor 202-1 via MEC interface 205. According to an exemplary scenario, edge distributor 202 or another control layer network device of MEC network 115-1 (e.g., an orchestrator, an edge controller, etc.) may determine that static content pertaining request 303 is not stored 305 at MEC network 115-1. Referring to FIG. 3B, for example, edge distributor 202-1 may invoke the edge content distribution service 309 to obtain the static content for provisioning the requested application service. As further illustrated in FIG. 3B, edge distributor 202-1 may perform a lookup using the tiered lookup service information 312 associated with the lookup service of the edge content distribution service. For example, referring to FIG. 3C, for example, edge distributor 202-1 may identify the application service and/or a static content identifier (e.g., based on request 303 or control layer communication within MEC devices 117 of MEC network 115-1). Edge distributor 202-1 may select a correlated overlay network 204 from which to obtain the static pieces of content from other edge distributors 202 of the selected overlay network 204.

Figure 3D:
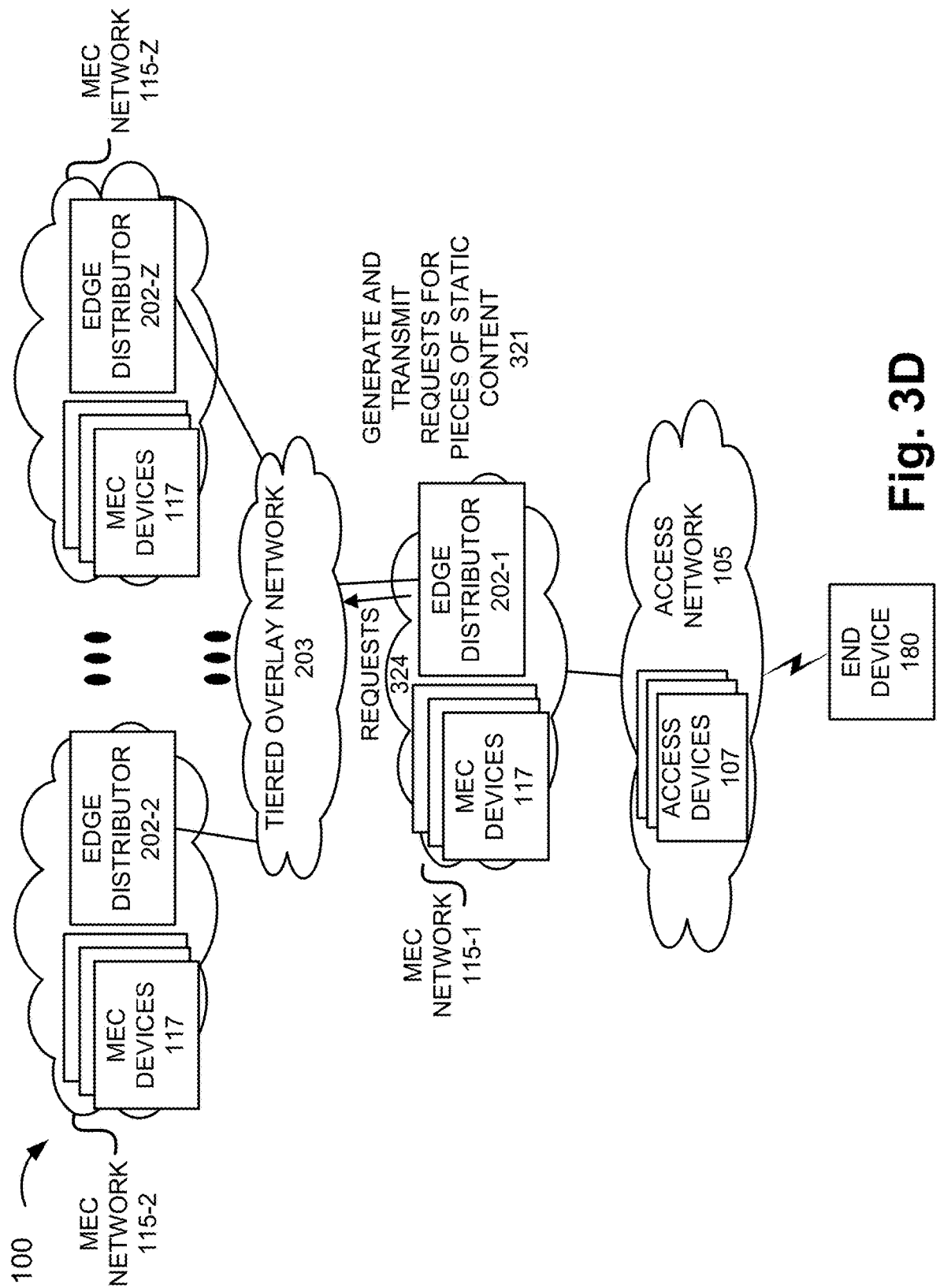
Figure 3E:
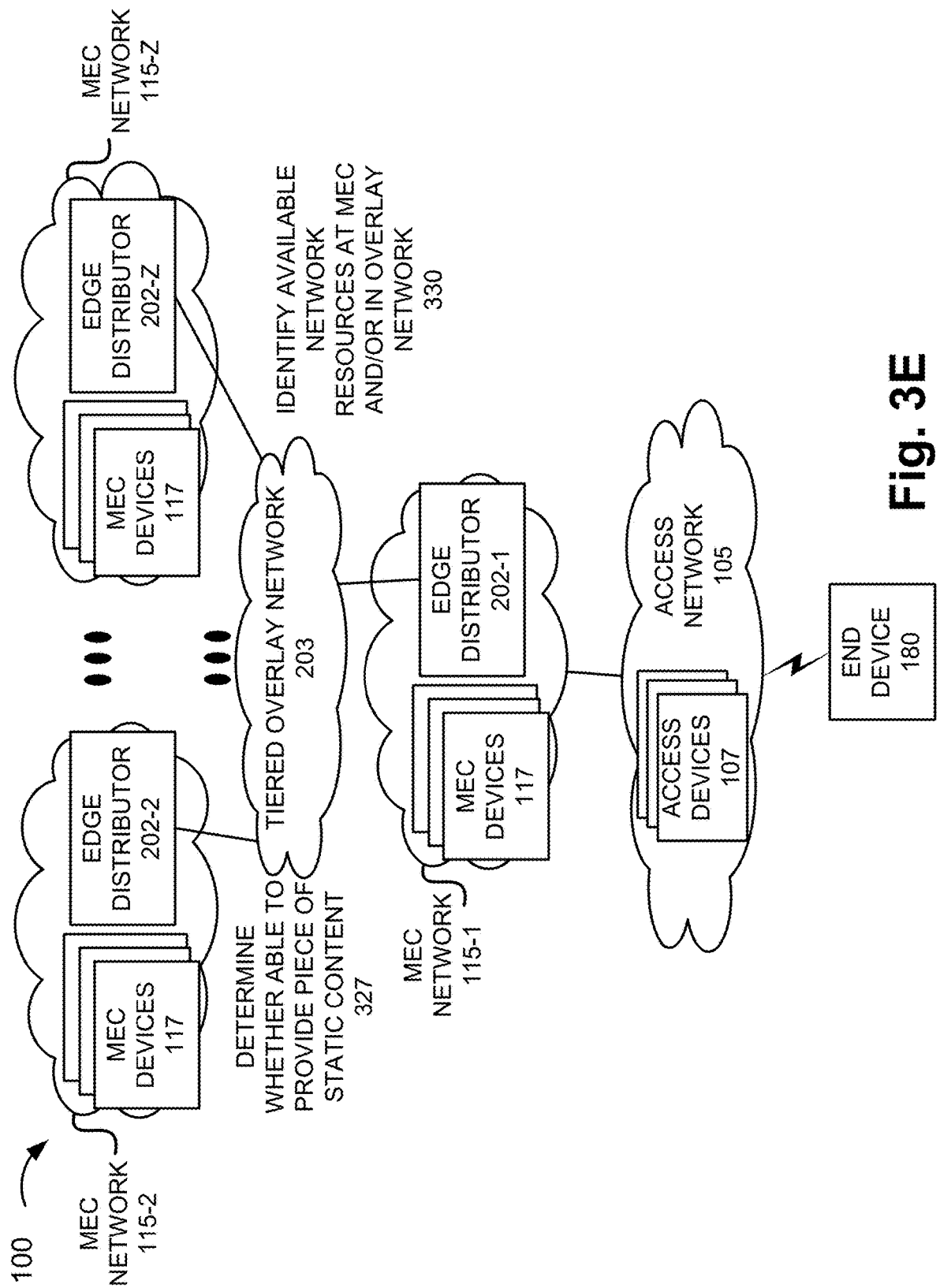

Referring to FIG. 3D, edge distributor 202-1 may generate and transmit requests for pieces of static content 321. The requests 324 may propagate to other edge distributors 202 via an overlay network 204 of tier overlay network 203. Referring to FIG. 3E, for example, in response to receiving a request via data manager and edge interface 215, the other edge distributors 202 may determine whether they can provide the static piece of content 327. For example, the other edge distributors 202 may use the lookup service and the tiered lookup service information. According to some exemplary embodiments, edge distributors 202 (or other control layer network device of MEC network 115) may identify available network resources at MEC network 115 and/or in overlay network 330 as a part of determining whether the static piece of content is provided to the (requesting) edge distributor 202-1.

Figure 3F:
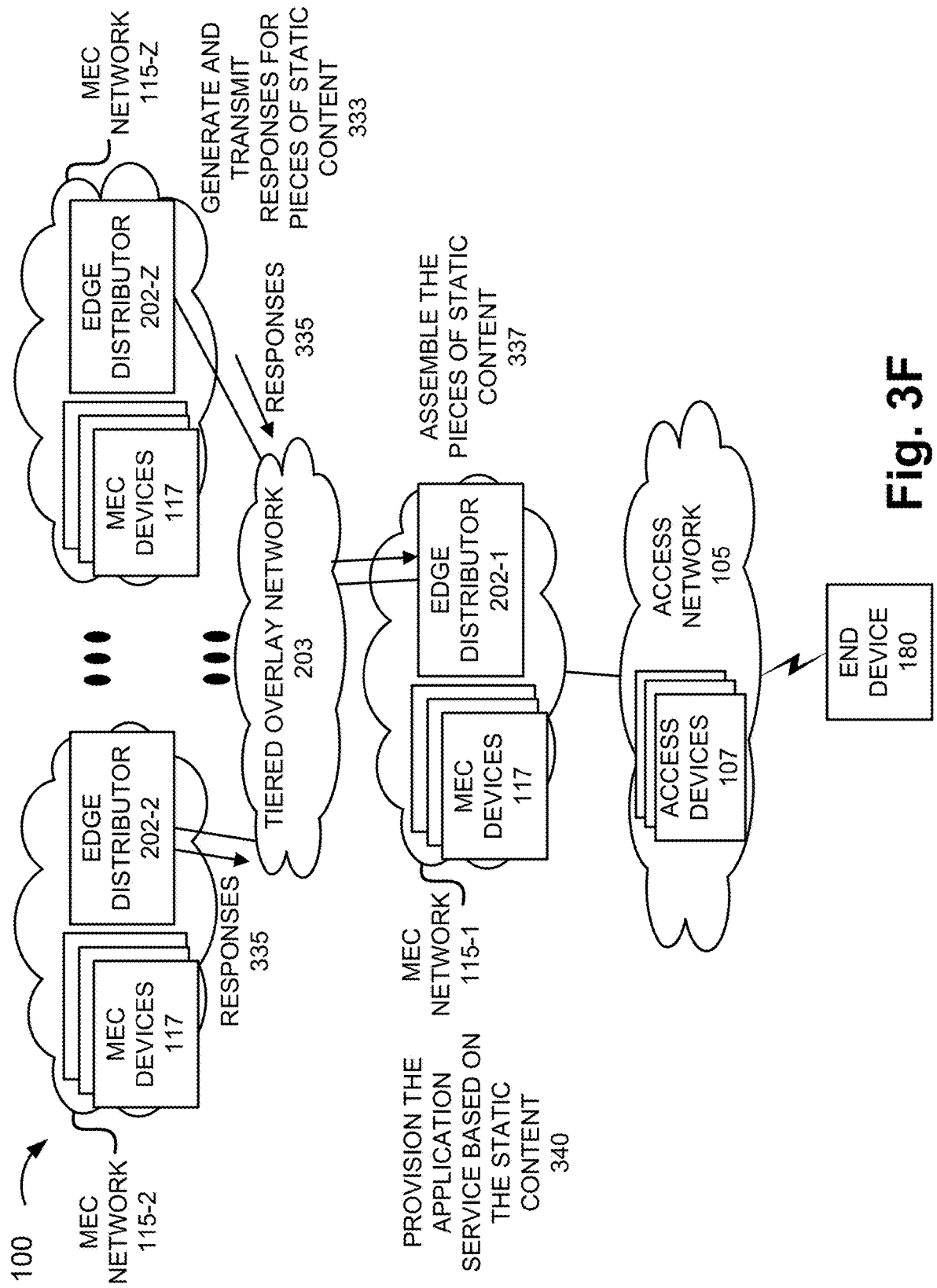

Referring to FIG. 3F, according to this exemplary scenario, assume that the other edge distributors 202 may provide respective pieces of static content. The other edge distributors 202 may generate and transmit responses for pieces of static content 333 via data manager and edge interface 215. The response 335 may include a piece of the static. As further illustrated, edge distributor 202-1 may receive the pieces of static content via the overlay network 204, and assemble the pieces of static content 337. Edge distributor 202-1 may provide the assembled static content to MEC device 117 (e.g., a VM manager, a host device for the application service, etc.) via MEC interface 205, and MEC device 117 may provision the application service based on the static content 340.

FIGS. 3A-3F illustrate an exemplary process of the edge content distribution service, according to other exemplary embodiments, the process may include additional, different, and/or fewer steps. For example, as previously described, according to another exemplary scenario, edge distributor 202-1 may identify a missing piece of static content, and may select another overlay network 204 from which to obtain the piece of static content. Additionally, or alternatively, other reasons may exist from which edge distributor 202-1 may use another overlay network, such as available network resources at the (serving) MEC network 115, available network resources in the portion of the overlay network 204 via which the piece of static content would be pulled or downloaded to the (requesting) MEC network 115. Additionally, or alternatively, edge distributor 202-1 may elect obtain the static content (in whole or in part) from network device 130 when there is a problem obtaining a piece of static content, and so forth.

FIG. 4 is a diagram illustrating exemplary components of a device 400 that may be included in one or more of the devices described herein. For example, device 400 may correspond to MEC device 117 of MEC network 115, network device 130, end device 180, edge distributor 202, and/or other types of network devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 10 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to MEC device 117 and edge distributor 202, software 420 may include an application that, when executed by processor 410, provides a function of the edge content distribution service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a MEC network 115 or another type of application service layer network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
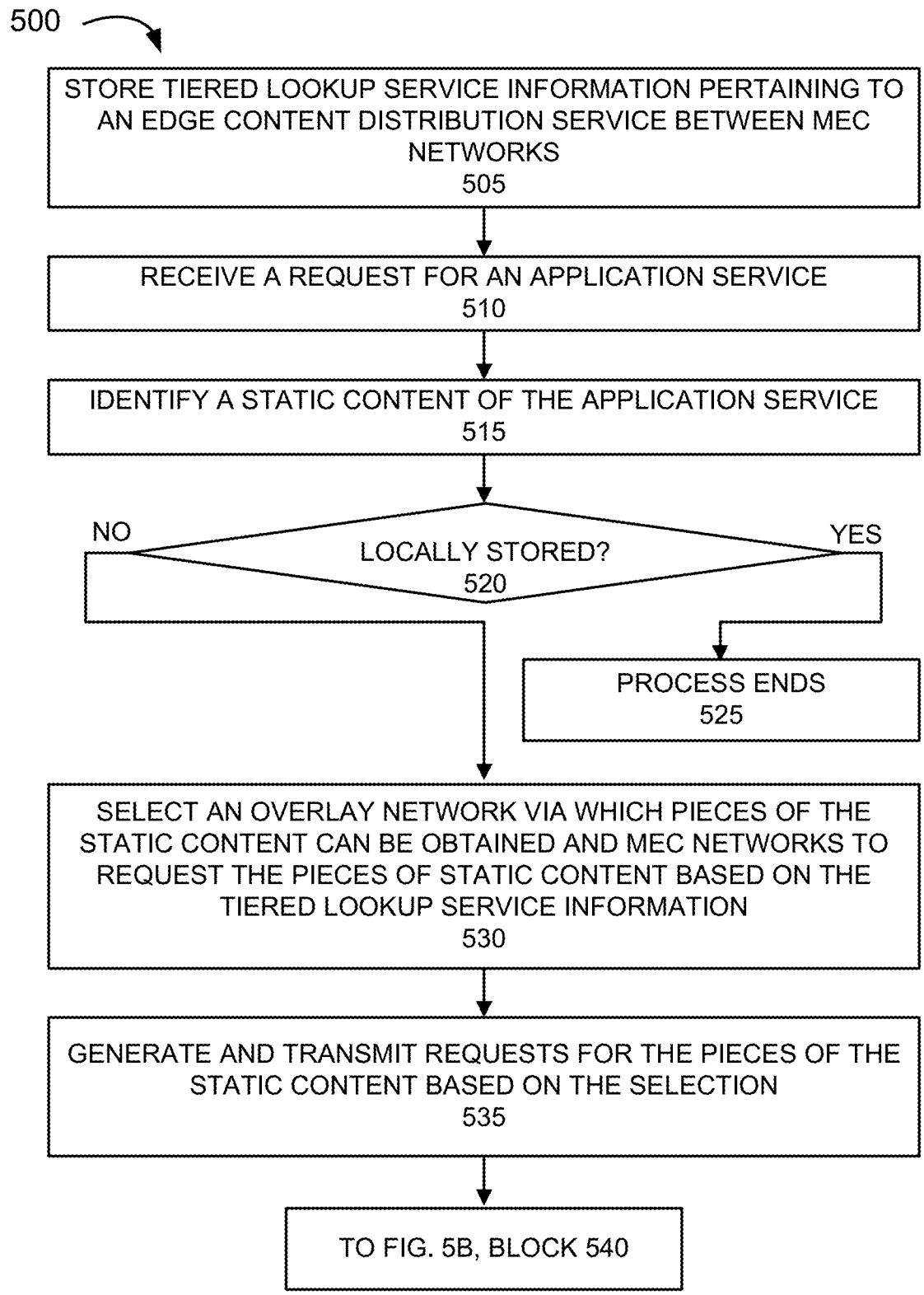
FIGS. 5A and 5B are a flow diagram illustrating an exemplary process of an exemplary embodiment of the edge content distribution service.
Figure 5B:
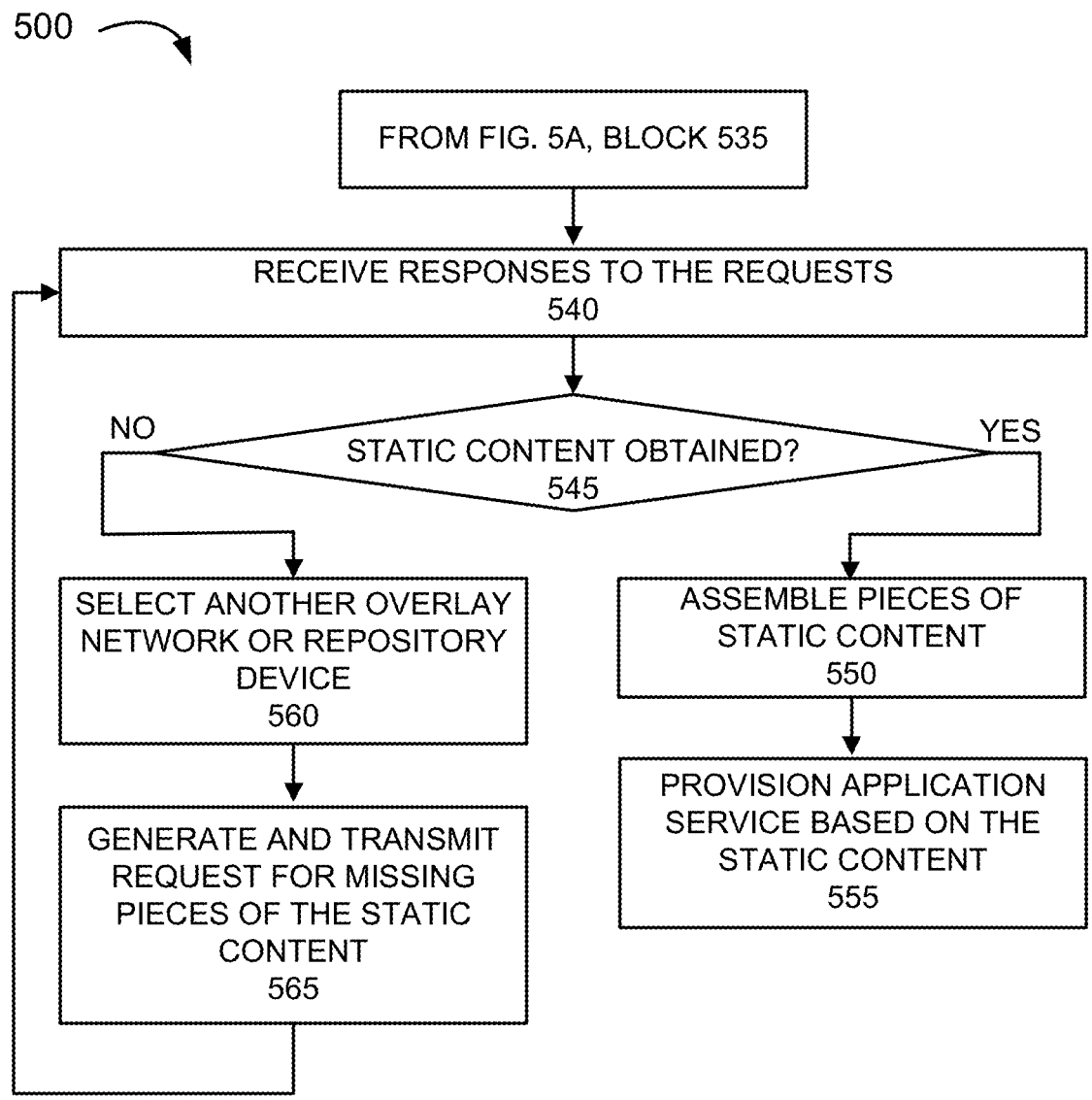

FIGS. 5A and 5B are a flow diagram illustrating an exemplary process 500 of an exemplary embodiment of the edge content distribution service. According to an exemplary embodiment, MEC device 117, such as edge distributor 202, may perform steps of process 500. According to an exemplary implementation, processor 410 executes software 420 to perform a step illustrated in FIG. 5, and described herein. Alternatively, a step illustrated in FIG. 5 and described herein, may be performed by execution of only hardware.

Referring to FIG. 5A, in block 505, tiered lookup service information pertaining to an edge content distribution service between MEC networks may be stored. For example, edge distributor 202 may store, as a part of the lookup service included in the edge content distribution service, as described herein, the tiered lookup service information (e.g., table 230).

In block 510, a request for an application service may be received. For example, edge distributor 202 may receive an application service request from end device 180. According to another example, edge distributor 202 may receive a request from a device other than end device 180. For example, as a part of a handover procedure between MEC networks 115 (e.g., due to the mobility of end device 180, etc.), edge distributor 202 may receive a request for a control layer network device of the source MEC network 115 to provision the application service.

In block 515, a static content of the application service may be identified. For example, edge distributor 202 may identify the static content based on the request or other communication associated with MEC devices 117. The static content may be used to provision the application service (e.g., a configuration file, etc.) or other fixed content that may be used by the application service (e.g., a movie to stream, etc.).

In block 520, it may be determined whether the static content is locally stored. For example, edge distributor 202 may directly or indirectly (e.g., based on communication with a control layer network device of MEC network 115 (e.g., edge controller, orchestrator, etc.) whether the identified static content is locally stored. Alternatively, this step may be omitted. For example, edge distributor 202 may receive the request for the application service only when the static content is not locally stored in MEC network 115.

When it is determined that the static content is locally stored (block 520—YES), process 500 may end. For example, the application service may be provisioned in MEC network 115, and provided to end device 180.

When it is determined that the static content is not locally stored (block 520—NO), an overlay network via which pieces of the static content can be obtained and MEC networks to request the pieces of static content may be selected based on the tiered lookup service information (block 530). For example, edge distributor 202 may select an overlay network 204, from among multiple overlay networks 204 of tiered overlay network 203, based on the identified static content (and/or application service). As previously described, the correlated overlay network 204 may satisfy performance metric information included in the tiered lookup service information. Additionally, edge distributor 202 may select MEC networks of the overlay network to generate and transmit requests for pieces of the static content based on the correlated network address information included in the tiered lookup service information.

In block 535, requests for the pieces of the static content may be generated and transmitted based on the selection. For example, edge distributor 202 may generate and transmits the requests via the selected overlay network.

Referring to FIG. 5B, in block 540, responses to the requests may be received. For example, edge distributor 202 may receive responses to the transmitted requests. Edge distributor 202 may inspect and interpret the responses received.

In block 545, it may be determined whether the static content has been obtained. For example, edge distributor 202 may determine whether or not all pieces of the static content have been obtained based on a static piece identifier associated with a static piece of content or some other type of data management mechanism.

When it is determined that all of the pieces of static content have been received (block 545—YES), the pieces of the static content may be assembled (block 550). For example, edge distributor 202 may assemble the pieces to form the static content. In block 555, the application service may be provisioned based on the static content. For example, edge distributor 202 may transmit the static content to another MEC device 117 (e.g., an edge controller) or a host device, which may provide for the provisioning of the application service.

When it is determined that all of the pieces of static content have not been received (block 545—NO), another overlay network or a repository device may be selected (block 560). For example, edge distributor 202 may select another overlay network 204 and/or network device 130 to obtain any missing pieces of the static content. According to various exemplary embodiments, edge distributor 202 may consider various factors, such as time constraints, whether there are (or not) other overlay networks available, and so forth.

In block 565, request for the missing pieces of static content may be generated and transmitted. For example, edge distributor 202 may generate and transmit the request to MEC networks of the other overlay network and/or network device 130. Process 500 may continue to block 540.

FIGS. 5A and 5B illustrate an exemplary process 500 of the edge content distribution service, however, according to other embodiments, process 500 may include additional operations, fewer operations, and/or different operations than those illustrated in FIG. 5, and described herein. For example, as previously described, process 500 may include a step that includes consideration of other factors, such as network resource information pertaining to an overlay network 204 and/or candidate (serving) MEC network 115. According to an exemplary embodiment, MEC networks 115 of an overlay network may communicate (e.g., periodically, etc.) to each other regarding network resource availability allocated to support the edge content distribution service. Additionally, or alternatively, the issue of available network resources at a (serving) MEC network 115 may be determined, by the (serving) MEC network 115 and in response to receiving a request for a piece of static content from a (requesting) MEC network 115. According to such an embodiment, the (serving) MEC network 115 may indicate the unavailability of network resources in its response. According to some exemplary embodiments, the (requesting) MEC network 115 may consider the network resource information pertaining to candidate (serving) MEC network 115 and/or overlay network 204 before requests for pieces of static content are generated and transmitted, and when subsequently selecting another overlay network 204 for various reasons (e.g., missing pieces of static content, etc.). For example, edge distributor 202 may compare threshold available network resource information to the network resource information obtained from (serving) MEC networks 115 and/or overlay network 204 that are correlated to the application service, static content identifier, and/or other information of a record 270.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the process illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   storing, by a network device of an application service layer network, tiered lookup service information that indicates overlay networks that are tiered based on performance metrics pertaining to static contents of application services, and network addresses of respective sets of other application service layer networks that store portions of respective sets of the static contents including static configuration data that configures the application services;
   receiving, by the network device, a request for one of the application services;
   identifying, by the network device, one of the static contents of the one of the application services;
   selecting, by the network device based on the tiered lookup service information, one of the overlay networks via which pieces of the one of the static contents can be obtained and network addresses of other application service layer networks of the one of the overlay networks from which to request the pieces of the one of the static contents, wherein at least one of the pieces of the one of the static contents includes static configuration data that configures the one of the application services;
   transmitting, by the network device via the one of the overlay networks, requests for the pieces of the one of the static contents;
   receiving, by the network device via the one of the overlay networks, responses; and
   provisioning, by the network device, the one of the application services based on the responses.

2. The method of claim 1, wherein the performance metrics include first performance metrics pertaining to acquisition and delivery of the static contents.

3. The method of claim 2, wherein the first performance metrics include threshold parameters and values pertaining to at least one of latency, error rate, or throughput.

4. The method of claim 1, further comprising:
   determining, by the network device in response to receiving the responses, whether all of the pieces of the one of the static contents have been received; and
   selecting, by the network device in response to determining that not all of the pieces of the one of the static contents have been received, another one of the overlay networks via which missing pieces of the one of the static contents can be obtained and a network address of still other application service layer networks of the other one of the overlay networks from which to request the missing pieces of the one of the static contents.

5. The method of claim 1, wherein the performance metrics include second performance metrics pertaining to available network resources at the other application service layer networks of the one of the overlay networks.

6. The method of claim 5, further comprising:
   comparing, by the network device, the second performance metrics to network resource information received from the other application service layer networks of the one of the overlay networks; and
   determining, by the network device, whether to generate and transmit the requests based on a result of the comparing.

7. The method of claim 1, wherein the responses include the pieces of the one of the static contents, and the method further comprising:
   assembling, by the network device, the pieces of the one of the static contents.

8. The method of claim 1, wherein the application service layer network is a multi-access edge computing (MEC) network, and wherein the static configuration data includes a server component.

9. A network device comprising:
   a communication interface;
   a memory, wherein the memory stores instructions; and a processor, wherein the processor executes the instructions to:
    store tiered lookup service information that indicates overlay networks that are tiered based on performance metrics pertaining to static contents of application services, and network addresses of respective sets of other application service layer networks that store portions of respective sets of the static contents, wherein the network device is included in an application service layer network including static configuration data that configures the application services;
    receive, via the communication interface, a request for one of the application services;
    identify one of the static contents of the one of the application services;
    select, based on the tiered lookup service information, one of the overlay networks via which pieces of the one of the static contents can be obtained and network addresses of other application service layer networks of the one of the overlay networks from which to request the pieces of the one of the static contents, wherein at least one of the pieces of the one of the static contents includes static configuration data that configures the one of the application services;
    transmit, via the communication interface and the one of the overlay networks, requests for the pieces of the one of the static contents;
    receive, via the communication interface and one of the overlay networks, responses; and
    provision the one of the application services based on the responses.

10. The network device of claim 9, wherein the performance metrics include first performance metrics pertaining to acquisition and delivery of the static contents.

11. The network device of claim 10, wherein the first performance metrics include threshold parameters and values pertaining to at least one of latency, error rate, or throughput.

12. The network device of claim 9, wherein the processor further executes the instructions to:
    determine, in response to receiving the responses, whether all of the pieces of the one of the static contents have been received; and
    select, in response to determining that not all of the pieces of the one of the static contents have been received, another one of the overlay networks via which missing pieces of the one of the static contents can be obtained and a network address of still other application service layer networks of the other one of the overlay networks from which to request the missing pieces of the one of the static contents.

13. The network device of claim 9, wherein the responses include the pieces of the one of the static contents, and wherein the processor further executes the instructions to:
    assemble the pieces of the one of the static contents.

14. The network device of claim 9, wherein the performance metrics include second performance metrics pertaining to available network resources at the other application service layer networks of the one of the overlay networks.

15. The network device of claim 14, wherein the processor further executes the instructions to:
    compare the second performance metrics to network resource information received from the other application service layer networks of the one of the overlay networks; and
    determine whether to generate and transmit the requests based on a result of the comparison.

16. The network device of claim 9, wherein the application service layer network is a multi-access edge computing (MEC) network, and wherein the static configuration data includes a server component.

17. A non-transitory computer-readable storage medium storing instructions executable by a processor of a device, which when executed cause the device to:
    store tiered lookup service information that indicates overlay networks that are tiered based on performance metrics pertaining to static contents of application services, and network addresses of respective sets of other application service layer networks that store portions of respective sets of the static contents, wherein the device is included in an application service layer network including static configuration data that configures the application services;
    receive a request for one of the application services;
    identify one of the static contents of the one of the application services;
    select, based on the tiered lookup service information, one of the overlay networks via which pieces of the one of the static contents can be obtained and network addresses of other application service layer networks of the one of the overlay networks from which to request the pieces of the one of the static contents, wherein at least one of the pieces of the one of the static contents includes static configuration data that configures the one of the application services;
    transmit, via the one of the overlay networks, requests for the pieces of the one of the static contents;
    receive, via the one of the overlay networks, responses; and
    provision the one of the application services based on the responses.

18. The non-transitory computer-readable storage medium of claim 17, wherein the performance metrics include first performance metrics pertaining to acquisition and delivery of the static contents.

19. The non-transitory computer-readable storage medium of claim 18, wherein the first performance metrics include threshold parameters and values pertaining to at least one of latency, error rate, or throughput.

20. The non-transitory computer-readable storage medium of claim 17, wherein the application service layer network is a multi-access edge computing (MEC) network, and wherein the static configuration data includes a server component.

* * * * *